No. 11,752. Reissued June 20, 1899.

R. B. SIMPSON.

MANDOLIN.

(Application filed July 14, 1898.)

WITNESSES:—

J. M. Mothershead

James Gilford Browning.

INVENTOR,

Roy B. Simpson,

BY

A. L. Jackson,

ATTORNEY.

THE NORRIS PETERS CO., PHOTO-LITHO., WASHINGTON, D. C.

UNITED STATES PATENT OFFICE.

ROY B. SIMPSON, OF DALLAS, TEXAS, ASSIGNOR OF ONE-HALF TO WALTER E. KAYE, OF FORT WORTH, TEXAS.

MANDOLIN.

SPECIFICATION forming part of Reissued Letters Patent No. 11,752, dated June 20, 1899.

Original No. 594,436, dated November 30, 1897. Application for reissue filed July 14, 1898. Serial No. 685,966.

*To all whom it may concern:*

Be it known that I, ROY B. SIMPSON, of Dallas, Texas, have invented certain new and useful Improvements in Mandolins, (for which Letters Patent were granted to me on November 30, 1897,) of which the following is a specification.

My invention relates to mandolins; and the objects are to obtain a tone for mandolins as nearly as possible equal to that of violins and other stringed instruments played by bows, to attain a penetrating tone never before accomplished, to facilitate the rendering of slurred passages in music, to obtain harmonics as readily as on bow stringed instruments, to increase the range of scale without increasing the length of the neck, to avoid the harsh metallic tones so common in mandolins, to make mandolins more durable, to prevent the instrument from splitting and cracking when subjected to sudden changes of temperature, and to prevent the warping of the neck. I accomplish these objects by the novel construction of parts hereinafter fully described and more particularly pointed out in the claims.

Reference is had to the accompanying drawings, forming a part of this specification.

Figure 1:
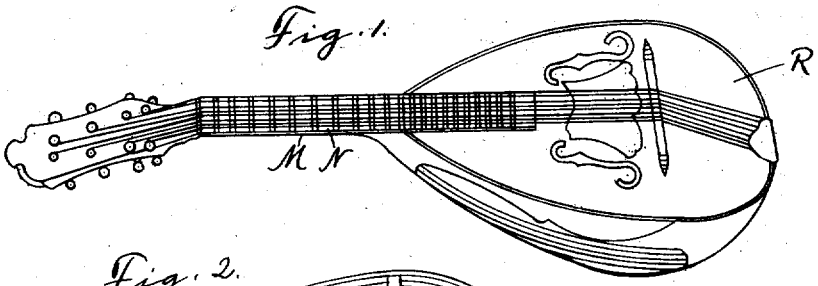
Figure 2:
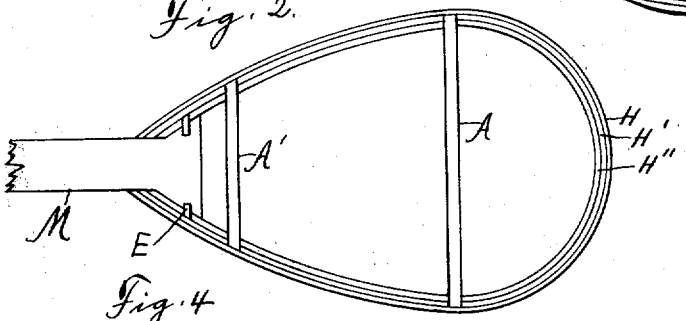
Figure 4:
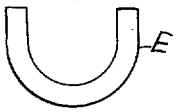
Figure 3:
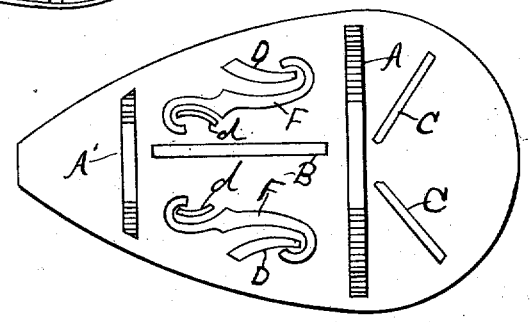
Figure 5:
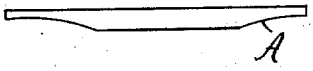
Figure 6:
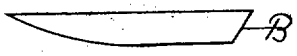
Figure 7:
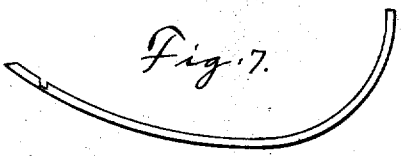

Figure 1 is a perspective view of a mandolin, showing an increased number of frets and the improved sound-holes. Fig. 2 is a view, partly broken, with the top or sounding-board removed to show the arrangement of the end piece of the neck and the brace-bars. Fig. 3 is a view of the top or sounding-board inverted, showing arrangement of braces and sound-holes. Fig. 4 is a view of the U-shaped brace for the end piece of the neck of the mandolin. Figs. 5 and 6 are side elevations of the braces. Fig. 7 is a side elevation of one of the ribs, showing a mortised place for the U-shaped brace.

Similar letters of reference are used to indicate the same parts throughout the several views.

Fig. 1 shows the finger-board N, which is attached to the neck M. Instead of seventeen frets, twenty-two or more are inserted in the finger-board. The sounding-holes F F are shown in Figs. 1 and 3.

Fig. 2 shows the braces A and A′ mortised in the reinforcing-strip H″ and the shell H′ and extending to the jacket H. Fig. 5 shows the shape of these braces. Brace A relieves the pressure of the springs under the bridge. Brace A′ relieves the strain on the neck and prevents warping of the neck. Besides being mortised in the shell these braces are glued to the sounding-board R. The bar B is glued to the under side of the sounding-board and parallel with the G or large strings. This bar equalizes the tone on the four double strings and creates a penetrating power that cannot be obtained without it. The bars D D and *d d* brace the delicate parts of the sounding-board. All of these braces are glued to the under side of the sounding-board and may be made of any suitable wood whose acoustic properties correspond with the acoustic properties of the wood used in constructing the mandolin. The bars C C are also glued to the under side of the sounding-board and prevent the splitting of the sounding-board caused by the sudden changes of temperature. These bars are to be very thin.

The sound-holes F F are preferably *f*-shaped or *s*-shaped. They may have the shape of the $-mark, or they may be straight parallel holes, or they may be in the shape of ornamental or fancy scrollwork on each side of or parallel with the strings and must be on each side of the strings. This arrangement of the sound-holes allows an extension of the finger-board.

Fig. 6 shows the shape of the bar B. The tapering end of this bar points toward the neck of the mandolin. The U-shaped brace is mortised in the neck of the mandolin and also in the ends of the ribs. This brace may be made of vulcanized rubber, gutta-percha, or some hard substance that will not impair the acoustic properties of the wood used in constructing the instrument. This brace prevents the splitting or chipping off of the end piece of the neck where the ends of the ribs are glued on. The mortises in the ends of the ribs hold the ribs in place and prevent the neck from bending up when subjected to great strain by the strings. It will be understood that the reinforcing-strip H″ is cut into to allow brace E to extend partly into the ends of the ribs.

It will be understood that the mechanical construction of the instrument will make it strong and durable. The shape and arrangement of the sound-holes give qualities to the tone of the mandolin never before obtained. In other mandolins the sound-holes do not allow more than half of the vibrating-air capacity of the instrument to respond when the strings are struck by the pick or plectrum. In my mandolin all the air capacity is utilized. The vibrating-air capacity in my mandolin is so great that it vibrates to B natural, and in other mandolins the vibrating-air capacity vibrates only to G natural, which is two tones lower, and consequently when my mandolin is tuned to concert pitch the tension of the strings is not so great as that required in other mandolins, thereby lessening considerably the danger of breaking strings.

The particular arrangement of the sound-holes and the bass bar B gives a smooth tone, necessary for the rendition of the slurred passages in music, as well as making it possible to tune the mandolin to a higher pitch than other mandolins. The bass bar and the sounding-holes by means of the greater vibrating-air capacity prevent the harsh metallic sound noticed in other mandolins.

I have an improvement in frets for mandolins. In other mandolins brass and German silver have been used and the finger-boards last only a short time. I have found that steel frets will last longer than the brass or German-silver frets and can be made much smaller and almost flush with the surface of the finger-board. On other mandolins a person can practice only a short time before the fingers become sore and blistered. When steel frets are used, the strings may lie much closer to the finger-board, thereby rendering the fingering of the instrument much easier. Using steel makes it possible to put in a greater number of frets, because the steel frets can be made very narrow, thereby leaving the spaces between the frets wide, notwithstanding the increase in the number of the frets, and consequently the fingering of rapid passages in the upper register is greatly facilitated.

Having fully described my invention, what I claim as new, and desire to secure by Letters Patent, is—

1. A mandolin having a neck-piece provided with a U-shaped brace mortised therein.

2. A mandolin having a sounding-board provided with sounding-holes arranged parallel, curved braces glued to the under side of said board, one set of said braces being arranged on the outside of and near one end of said holes and another set of braces on the inside of and near the other end of said holes.

3. A mandolin having a neck-piece, a finger-board attached to said neck-piece, a shell and a jacket attached to and inclosing the inner end of said neck-piece, and a U-shaped brace mortised in said shell and neck-piece.

4. A mandolin having a neck-piece, a shell attached to said neck-piece, and a U-shaped brace mortised in said neck and said shell.

5. A mandolin having a neck-piece, a shell attached to said neck-piece, a U-shaped brace mortised in said neck-piece and said shell, and cross-braces mortised in said shell.

6. A mandolin having a neck-piece, a shell and a finger-board attached thereto, said finger-board being provided with steel frets, a U-shaped brace mortised in said shell and neck-piece, a sounding-board provided with a bass bar and having sound-holes.

7. A mandolin having a sounding-board provided with two *f*-holes, one on each side of the center of the instrument, whereby the finger-board may be extended farther over the sounding-board and be provided with an increased number of frets, and the finger-board having an increased number of frets, and means under the sounding-board for strengthening the edges of the board about the holes of said board without impairing the sound of the instrument comprising braces radiating from said holes.

8. A mandolin having a sounding-board provided with two *f*-holes just above the bridge, one on each side of the center of the instrument, whereby the finger-board may be extended farther over the sounding-board and be provided with an increased number of frets, and the finger-board having an increased number of frets, and means under the sounding-board for strengthening the board about the edges of the holes of said board without impairing the sound of the instrument comprising braces radiating from said holes.

ROY B. SIMPSON.

Witnesses:
A. CUSTEAD,
H. L. OLDHAM.